United States Patent
Law

(10) Patent No.: US 7,058,586 B1
(45) Date of Patent: Jun. 6, 2006

(54) INFORMATION DELIVERY SYSTEM FOR PROVIDING SENDERS WITH A RECIPIENT'S MESSAGING PREFERENCES

(75) Inventor: Robert A. Law, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 1212 days.

(21) Appl. No.: 09/588,763

(22) Filed: Jun. 6, 2000

(51) Int. Cl.
*G06F 17/60* (2006.01)

(52) U.S. Cl. .............................. 705/5; 705/1

(58) Field of Classification Search .............. 705/1, 705/7, 8, 10, 5
See application file for complete search history.

(56) References Cited

U.S. PATENT DOCUMENTS

| | | | |
|---|---|---|---|
| 4,639,873 A | 1/1987 | Baggarly et al. | 364/465 |
| 4,725,718 A | 2/1988 | Sansone et al. | 235/495 |
| 4,734,865 A | 3/1988 | Scullion et al. | 364/478 |
| 4,752,950 A | 6/1988 | Le Carpentier | 379/106 |
| 4,797,830 A | 1/1989 | Baggarly et al. | 364/464.03 |
| 4,831,554 A | 5/1989 | Storace et al. | 364/519 |
| 4,873,645 A | 10/1989 | Hunter et al. | 364/479 |
| 4,882,675 A | 11/1989 | Nichtberger et al. | 364/401 |
| 4,959,795 A | 9/1990 | Christensen et al. | 364/464.03 |
| 5,008,827 A | 4/1991 | Sansone et al. | 364/464.02 |
| 5,024,153 A | 6/1991 | Bannister et al. | 101/91 |
| 5,043,908 A | 8/1991 | Manduley et al. | 364/478 |
| 5,053,955 A | 10/1991 | Peach et al. | 364/401 |
| 5,058,030 A | 10/1991 | Schumacher | 364/478 |
| 5,072,400 A | 12/1991 | Manduley | 364/478 |
| 5,168,804 A | 12/1992 | Lee et al. | 101/99 |
| 5,177,687 A | 1/1993 | Baggarly et al. | 364/464.03 |
| 5,274,696 A | 12/1993 | Perelman | 379/89 |
| 5,283,731 A | 2/1994 | Lalonde et al. | 364/401 |
| 5,321,604 A | 6/1994 | Peach et al. | 364/401 |
| 5,329,578 A | 7/1994 | Brennan et al. | 379/67 |

(Continued)

FOREIGN PATENT DOCUMENTS

JP 2001034451 A * 2/2001

OTHER PUBLICATIONS

Murphy, Extracting Data From Users, Nov. 1, 1999, Internet world, 5, 32, 46.*

(Continued)

*Primary Examiner*—John W. Hayes
*Assistant Examiner*—Akiba Robinson-Boyce
(74) *Attorney, Agent, or Firm*—Angelo N. Chaclas; Steven J. Shapiro; George M. Macdonald

(57) ABSTRACT

An information delivery system includes a web server in operative communication with a plurality of recipients and a plurality of senders, the plurality of senders desirous of generating messages intended for the plurality of recipients, respectively. The web server includes a plurality of recipient preference profiles corresponding to the plurality of recipients, respectively, and a plurality of sender profiles corresponding to the plurality of senders, respectively. Each of the recipient preference profiles includes respective information directed to the recipient's preferences for receiving messages and the web server provides the plurality of senders with access to the plurality of recipient preference profiles. The web server maintains a relationship between a log of recipient preference profiles out of the plurality of recipient preference profiles that have been accessed by a particular sender. For each of the recipient preference profiles in the log of recipient preference profiles, the web server provides a change notification to the particular sender of a change in the recipient preference profile.

18 Claims, 3 Drawing Sheets

U.S. PATENT DOCUMENTS

| | | | |
|---|---|---|---|
| 5,383,115 A | 1/1995 | Lecarpentier | 364/554 |
| 5,384,708 A | 1/1995 | Collins et al. | 364/464.02 |
| RE34,915 E | 4/1995 | Nichtberger et al. | 364/401 |
| 5,454,038 A | 9/1995 | Cordery et al. | 380/23 |
| 5,490,077 A | 2/1996 | Freytag | 364/464.02 |
| 5,509,109 A | 4/1996 | Kim et al. | 395/114 |
| 5,535,126 A | 7/1996 | Mourgues | 364/464.02 |
| 5,579,449 A | 11/1996 | Strobel | 395/110 |
| 5,636,346 A | 6/1997 | Saxe et al. | 395/201 |
| 5,724,521 A | 3/1998 | Dedrick | 395/226 |
| 5,742,905 A | 4/1998 | Pepe et al. | 455/461 |
| 5,754,939 A | 5/1998 | Herz et al. | 455/4.2 |
| 5,761,648 A | 6/1998 | Golden et al. | 705/14 |
| 5,781,901 A | 7/1998 | Kuzma | 707/10 |
| 5,794,210 A | 8/1998 | Goldhaber et al. | 705/14 |
| 5,819,241 A | 10/1998 | Reiter | 705/408 |
| 5,822,739 A | 10/1998 | Kara | 705/410 |
| 5,948,061 A | 9/1999 | Merriman et al. | 709/219 |
| 6,072,862 A | 6/2000 | Srinivasan | 379/100.08 |
| 6,157,924 A | 12/2000 | Austin | 707/10 |
| 6,243,375 B1 | 6/2001 | Speicher | 370/352 |
| 6,847,387 B1 * | 1/2005 | Roth | 715/811 |

OTHER PUBLICATIONS

Strachman, Fleet Eyes Stronger customer Ties by Offering Personalized Web Pages, Mar., 1998, Bank Systems + Technology, v35, n3, p. 46.*

* cited by examiner

INFORMATION DELIVERY SYSTEM FOR PROVIDING SENDERS WITH A RECIPIENT'S MESSAGING PREFERENCES

CROSS REFERENCE TO RELATED APPLICATIONS

This application is related to the following co-pending applications filed concurrently herewith and commonly assigned to the assignee of this application: US Patent Application Number 09/588,443, entitled MESSAGING SYSTEM HAVING RECIPIENT PROFILING and U.S. patent application Ser. No. 09/588,853, entitled RECIPIENT CONTROL OVER ASPECTS OF INCOMING MESSAGES, both of which are specifically incorporated herein by reference.

FIELD OF THE INVENTION

This invention relates generally to information delivery systems. More particularly, in the preferred embodiments, this invention is directed to techniques allowing a recipient, receiving messages from a plurality of different senders desiring to communicate with the recipient, to control various aspects of the messages techniques for ensuring that the senders have access to updated recipient preferences.

BACKGROUND OF THE INVENTION

Traditionally, recipients (individuals, businesses and households) have had little opportunity to influence the mail that is sent to them. Merely having a post office address has served as an open invitation to mailers (one type of message senders) wishing to communicate with the recipient. Historically, recipients have been limited in their ability to control any aspects of the mail. On the other hand, senders understand little about the messaging preferences of the recipients and their interests.

Many factors place increased demands on the effectiveness of messages. First, the costs of generating and delivering messages is always increasing. Second, senders must compete for the recipient's attention due to the large number of messages that are typically received. Third, recipients need timely and easy access to their messages so that they are able to retrieve and discern them efficiently. Numerous other factors exist.

Generally, various postal authorities around the world provided some narrow ability for a recipient to control the mail. One service is mail forwarding where the mail is redirected from an original address specified by the sender to another address specified by the recipient. This service may be utilized when the recipient moves. Although this service generally works well, it suffers from certain drawbacks and disadvantages. As an example, delays are typically involved in redirecting the mail. Furthermore, the sender is typically unaware of the new address and may continue to send subsequent mail to the old address. Address correction databases that contain updated information about the recipient's address are only updated periodically and must be accessed by the sender to obtain that new information. This delay has potential negative consequences for both the sender and the recipient. As another example, delivery costs for the postal authority are increased because the mail is often routed to the old address before being forwarded to the new address. Therefore, due to all of the above, the sender and the recipient suffer a loss in quality of service while cost for the postal authority increase.

In addition to or as an alternative to notifying the postal authority and described above, the recipient who has moved may attempt to provide various senders with the new address. However, this is time consuming and generally not very effective since it may only pertain to physical mail.

Another type of service is mail holding where the mail is held by the postal authority and not delivered to the recipient. This service may be utilized when the recipient is away from home for a period of time. Although this service generally works well, it suffers from certain drawbacks and disadvantages. As an example, mail tends to collect at the postal authority facilities and this increases storage and handling costs for the postal authority. Furthermore, the sender is typically unaware of the hold that has been placed on delivery and may continue to send subsequent mail believing that the recipient is receiving mail. This compounds the storage problem for the postal authority and the timeliness issue for the sender and the recipient.

Therefore, due to all of the above, the sender and the recipient suffer a loss in quality of service while costs for the postal authority are generally increased. As a result, there is a need for improved exchange of information between the recipients and the senders that allow for a more efficient and effective process for senders to provide recipients with messages.

SUMMARY OF THE INVENTION

The present invention provides a information delivery system and methods for improving the collection and dissemination of recipient preferences for messages. Generally, this is accomplished by collecting recipient preference data and making it available to a plurality of senders for their use in preparing messages intended for a selected recipient.

In accordance with the present invention, there is provided an information delivery system includes a web server in operative communication with a plurality of recipients and a plurality of senders, the plurality of senders desirous of generating messages intended for the plurality of recipients, respectively. The web server includes a plurality of recipient preference profiles corresponding to the plurality of recipients, respectively, and a plurality of sender profiles corresponding to the plurality of senders, respectively. Each of the recipient preference profiles includes respective information directed to the recipient's preferences for receiving messages and the web server provides the plurality of senders with access to the plurality of recipient preference profiles. The web server maintains a relationship between a log of recipient preference profiles out of the plurality of recipient preference profiles that have been accessed by a particular sender. For each of the recipient preference profiles in the log of recipient preference profiles, the web server provides a change notification to the particular sender of a change in the recipient preference profile.

In accordance with the present invention, a method of operating a web server and a data structure are also provided.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed descrip

DETAILED DESCRIPTION OF THE PREFERRED EMBODIMENTS

Figure 1:
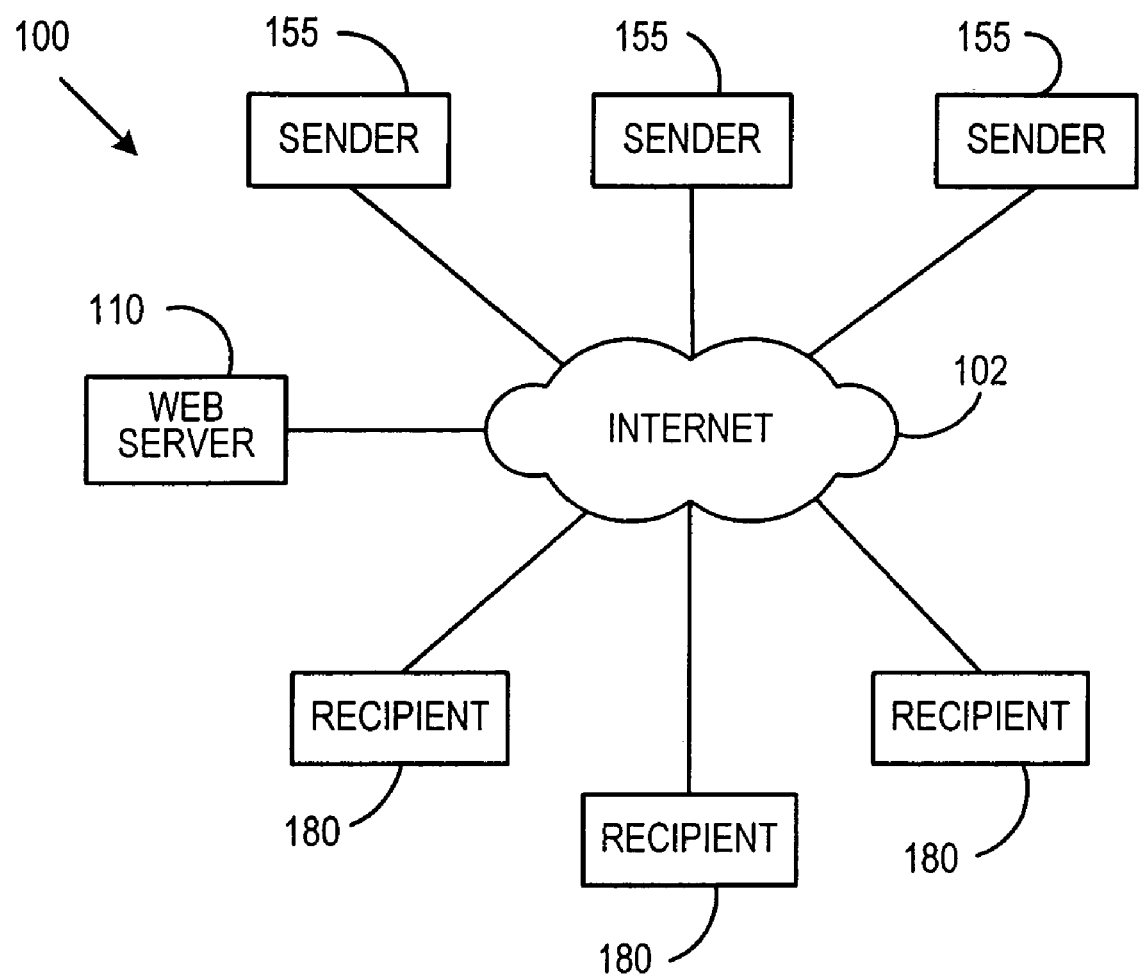
- FIG. 1 is a simplified representation of an information delivery system including a web server, a plurality of plurality of recipients and a plurality of senders, all in electronic communication with the web server, in which the present invention may be incorporated.

Referring to FIG. 1, an example of an information delivery system 100 in which the present invention may be incorporated is shown. The information delivery system 100 includes a web server 110, a plurality of recipients 180 and a plurality of senders 155. The plurality of recipients 180 and the plurality of senders 155 are in communication with the web server 110 over any suitable communication network (LAN, WAN, telephone line, Internet, etc.) 102. In conventional fashion, the web server 110 may be any computer system (hardware, operating system, Web server application software, TCP/IP protocols and the Web site content or pages) that provides World Wide Web services on the Internet. Generally, the web server 180 collects message preference data from the recipients 180 and makes it available to the senders 155 so that the senders 155 may more efficiently and effectively communicate their messages to the recipients 180. Therefore, those skilled in the art will recognize that the web server 110 may employ any suitable combination of computer hardware and software (control system) to facilitate the storage, access and processing of information and various communications that are required as described in greater detail below.

The recipients 180 may be geographically dispersed and connect to the web server 110 using any conventional type of computer based communication system. As an example, a recipient 180 may have a computer and gain Internet access over a standard telephone line via a modem using one of the various Internet Service Providers (ISP), such as: America Online or CompuServe. As another example, a recipient 180 may gain Internet access using Web TV. Those skilled in the art will recognize that not each recipient 180 need utilize the same type of computer based communication system in contacting the web server 110.

In analogous fashion, the senders 155 may be geographically dispersed and connect to the web server 110 using any conventional type of computer based communication system. Furthermore, to assist in the creation, addressing, output generation and/or delivery of messages, the senders 155 may employ any number and variety of messaging systems (not shown). Examples of messaging systems are: a traditional postage meter, such as the Personal Post™ meter; an open system postage meter, such as the ClickStamp™ online postage system employing a personal computer and a dot matrix (laser, ink jet, thermal transfer, etc.) printer; and an inserter system, such as the 8 Series™ inserting system; all available from Pitney Bowes of Stamford, Conn. Still other examples of messaging systems are shipping and logistics systems, addressing systems, such as the AddressRight™ system available from Pitney Bowes of Stamford, Conn., electronic mail and the like. Because messaging systems are well know, there descriptions have been limited for the sake of brevity to only that which is necessary to provide suitable background for an understanding of the present invention.

Figure 2:
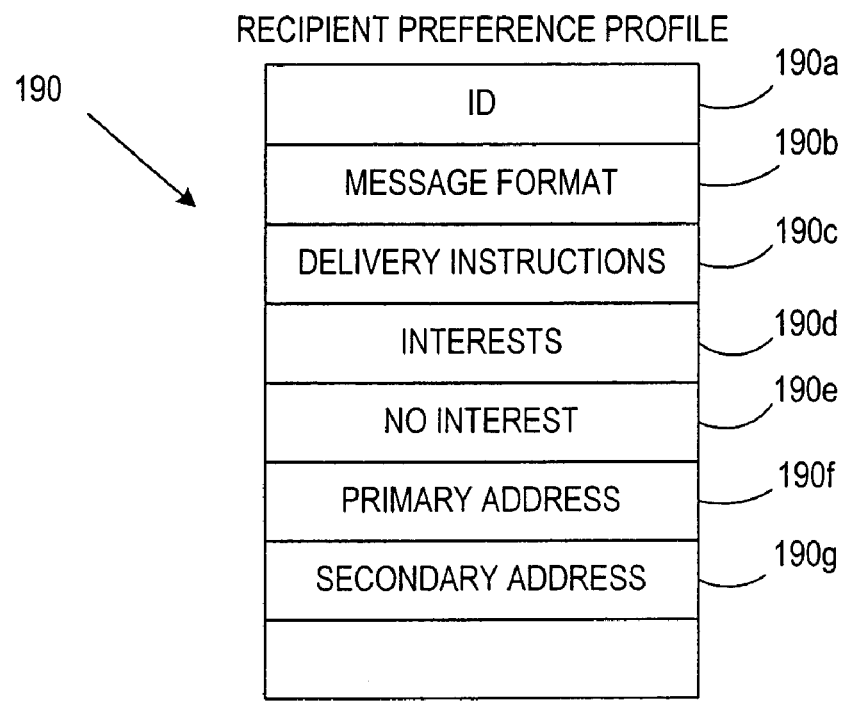
FIG. 2 is a schematic representation of a template for a recipient preference profile describing various parameters intended to control aspects of messages sent by the senders that are intended for the recipient, in accordance with the present invention.

The recipient 180 may be individual, a household, a business or any other type of entity/organization that receives messages. Referring to FIG. 2 in view of FIG. 1, a template for a recipient preference profile 190 is shown. As necessary, the recipients 180 may access their profiles in order to make corrections and changes to any information. The recipient preference profile 190 is preferably stored in any suitable memory device (database server, memory farm, hard disk, etc.) as part of or operatively connected to the web server 110 and defines various parameters intended to control aspects of messages sent by the senders 155 that are intended for the recipient. Those skilled in the art will recognize that the parameters defined below are mutually exclusive and may be employed in any combination.

The recipient preference profile 190 may include: a recipient identifier or ID data 190a; message format data 190b; delivery instruction data 190c; interest data 190d; no interest data 190e; primary address data 190f and secondary address data 190g. The recipient ID data 190a may be a name (individual, household or business) or any other suitably unique identifier (alphanumeric, etc.) and simply distinguishes the recipient 180 from other recipients 180. The message format data 190b may indicate the recipient's preferred mode of communication (physical mail, electronic mail, facsimile transmission, voice mail, etc.), combination of modes of communication and/or priority for modes of communication in which to receive messages. The delivery instruction data 190c indicates if any optional delivery preferences, such as: hold messages, temporary reroute messages, etc.; are active. For example, a hold message instruction may be utilized by the recipient 180 when the recipient 180 is not available (vacation, business travel, etc.) to receive messages. As another example, the temporary reroute messages instruction may be utilized by the recipient 180 when the recipient 180 wished to have messages sent to an alternate address 190g (described below) during selected time periods, such as: vacation addresses and the like. The interest data 190d indicates if the recipient 180 has any desire to hear from particular types of senders. The no interest data 190e indicates if the recipient 180 has any desire to not hear from particular types of senders. The primary address data 190f represents the default address (postal delivery, electronic mail, phone number, etc.) to which messages should be sent. If the recipient 180 moves, then the primary address data 190f may be updated by the recipient 180 to reflect a new address. Analogously, the secondary address data 190g represents an alternate address to which messages should be sent if directed so by the delivery instruction data 190c.

The interest data 190d and the no interest data 190e include indications of types of industry segments that the recipient may or may not, respectively, wish to hear from. These data 190d and 190e may be captured in any conventional manner. One system for available for use is the Standard Industry Code (SIC) system that assigns SIC numbers for a variety of well known industry segments. As examples, automobile rental companies would be assigned a SIC number in the range of 2100 to 2199, while automobile dealerships would be assigned a SIC number in the range of 2400–2499 and service stations would be assigned a SIC number in the range of 4000 to 4099. Still other SIC numbers exist for financial institutions, health care providers, legal service providers, professional associations, utility service providers, governmental agencies and a variety of other industry segments. Accordingly, SIC numbers corresponding to industries that the recipient 180 desires to hear from could be placed in the interest data 190d while SIC numbers corresponding to industries that the recipient 180 does not want to hear from could be placed in the no interest data 190e.

Figure 3:
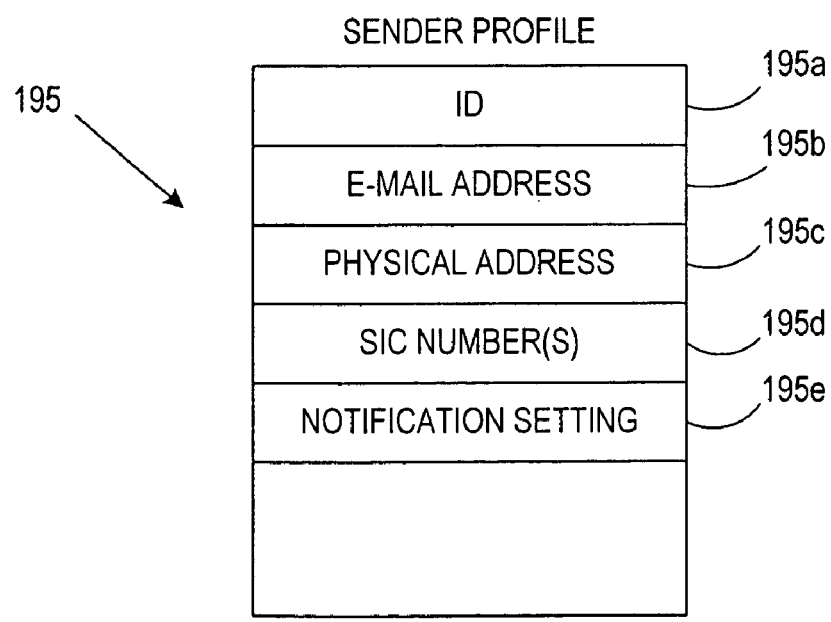
FIG. 3 is a schematic representation of a template for a sender profile describing various parameters intended to control aspects of how and when the web server communicates recipient preference profile data to the sender, in accordance with the present invention.

The sender 155 may be an individual, a household, a business or any other type of entity/organization that generates messages intended for a recipient. However, it is primarily anticipated that most senders 155 would be businesses. Referring to FIG. 3 in view of FIGS. 1 and 2, a template for a sender profile 195 is shown. As necessary, the senders 155 may access their profiles in order to make corrections and changes to any information.

The sender profile 195 is established by the sender 155 and may include: a sender identifier or ID data 195a; an e-mail address 195b; a physical address 195c; a series of SIC numbers 195d describing the sender; and notification setting data 195e. The sender ID data 195a may be a name (individual, household or business) or any other suitably unique identifier (alphanumeric, etc.) and simply distinguishes the sender 155 from other senders 155. The e-mail address 195b provides an electronic point of contact for the web server 110 to transmit messages to that are intended for the sender 155. The physical address 195c represents a street address for the sender 155. The series of SIC numbers 195d are, as defined and described above, used to categorize the subject matter of the sender's activities. The notification setting data 195e define how the web server 110 is to communicate with the sender 155. Those skilled in the art will recognize that the parameters defined above in the sender profile 195 are mutually exclusive and may be employed in any combination.

Figure 4:
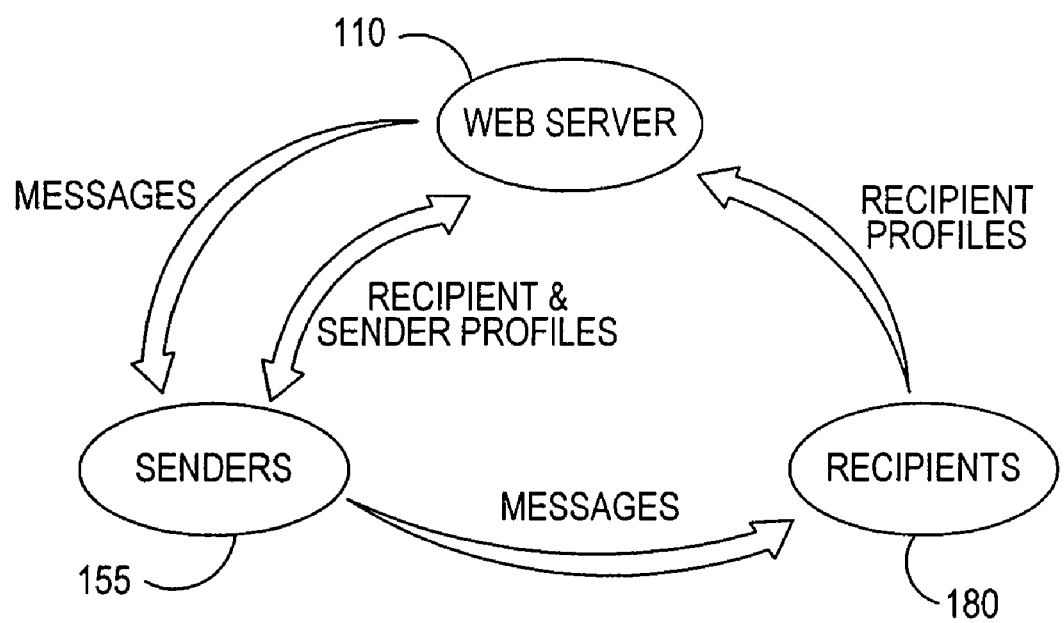
FIG. 4 is a schematic diagram of information flow between the web server, the recipients and the senders that facilitates the delivery of recipient preference profile data to the senders in accordance with the present invention.

With the structure of the information delivery system 100 described as above, the operational characteristics will now be described. Referring primarily to FIG. 4 while referencing the structure of FIGS. 1, 2 and 3, a schematic diagram of the information flow between the recipients 180, the web server 110 and the senders 155 that facilitates efficient and effective exchange of message preference information is shown.

Both recipients 180 and senders 155 provide data to the web server 110. Generally, the recipients 180 may establish their respective recipient preference profiles 190 with the web server 110 during a communication session in any conventional manner. Similarly, the senders 155 may establish their respective sender profiles 195 with the web server 110 during a communication session in any conventional manner. Those skilled in the art will recognize that the use of appropriate menu and/or command driven web pages that allow the recipient and sender to log on to and provide the sought after information described above may be accomplished in any conventional manner.

Senders 155 may access the recipient preference profiles 190 to gain better insights into how a particular recipient 180 wishes to be communicated with. Generally, it is anticipated that the senders 155 would access the profiles 190 at any time prior to dispatching a message for delivery to a particular recipient 180. The senders may access the profiles 190 through real time communication with the web server 110 or by downloading the profiles 190 on a periodic basis to their computer system for subsequent use. By having such ready access to up to date address information and recipient preferences, sender may communicate more efficiently and effectively with the recipients 180. Recipients 180 receive messages if they want them, in the format they want, when they want and where they want. By allowing recipients to control aspects of their incoming messages, their satisfaction is increased. Also, by utilizing the web server 110, faster updating of new addresses to senders is achieved because for updates need only occur at a single source. Thus, the delays and costs associated with the traditional practices described above are substantially alleviated.

For example, the interest data 190d and the no interest data 190e may be established by the senders 155 to more effectively route messages to the intended recipient 180. Using the interest data 190d, the senders 155 may scan the profiles 190 looking for recipients 180 that are likely to be interested in their messages (solicitations, informational communication, etc.). Thus, the senders 155 would achieve greater effectiveness on their message delivery programs because they would have an indication the certain recipients 180 have a previously acknowledged interest in a particular industry or industries. On the other hand, using the no interest data 190e, the senders 155 may also increase the effectiveness of their message delivery programs while reducing costs. While scanning the profiles 190 in general or accessing profiles 190 for recipients 180 that have already be designated to receive a message, the sender may terminate further processing of certain messages by out sorting any recipients that have provided an indication that they are not likely to be interested in any messages (solicitations, information communication, etc.) from a particular industry or industries. In other words, messages intended for such recipients will be terminated (not generated, not dispatched, etc.). Thus, the senders 155 would save costs by foregoing to dispatch any messages to these recipients 180. Additionally, these recipients 180 benefit in that the receipt of undesired messages does not distract them.

As an additional feature, the web server 110 may also notify the senders 155 of changes to the recipient preference profiles 190. In this manner, the senders 155 are even more certain of having up to date information. As specified by the notification setting data 195e, the web server 110 may provide a notification (e-mail, physical mail, popup window or other indicator during a subsequent communication session with the web server 110, or other suitable technique) to the sender 155 that the recipient preference profiles 190 have changed. If a recipient 180 updates its recipient preference profile 190 to reflect new information, then a change notification is generated. In the most preferred embodiment of the present invention, this is achieved by keeping track of which recipient preference profiles 190 the sender 155 has previously accessed and providing a notification to the sender 155 when there is a change to one of these previously accessed profile 190. The tracking may be accomplished in multiple ways. One example is to create and store a cookie. The cookie contains data created by the web server 110 that is stored on a sender's computer and provides a way for the web server 110 to keep track of a sender's activities. For example, the cookie may include a listing of the ID data 190a, along with a revision level or date, from all of the recipient profiles 190 that the sender 155 has accessed. Then, on each session with the web server 110, the data within the cookie may be contrasted with the recipient profiles 190 to determine if any changes have occurred. As another example, the listing of the ID data 190a, along with a revision level or date, from all of the recipient profiles 190 that the sender 155 has accessed may be stored along with the sender profile 195 at the web server 110. In this manner, the listing may be interrogated by the web server 110 on any periodic basis and without the need for the sender 155 to initiate a communication session. As yet another example, a listing of sender ID data 195a from those senders 155 accessing a particular recipient profile 190 may be associated with the particular recipient profile 190. Thus, if its recipient 180 changes the particular recipient profile 190, then the listing of senders 155 requiring notification is readily available. Still another feature is to allow the senders 155 the ability to add and remove recipient preference profiles 190 from the automatic notification process. Thus, the degree of relevance of the notifications they receive is improved.

Also, as an additional optional feature, if a new recipient 180 establishes a recipient preference profile 190, then a change notification may optionally be generated. In the most preferred embodiment of the present invention, this is achieved by scanning the interest data 190e of the newly added recipient preference profile 190 and notifying only those senders 155 that have matching interest descriptions. The senders 155 may be provided with the entire new recipient preference profile 190 or some subset thereof, such as an abstract or abbreviated recipient preference profile 190. Here again, it is preferable to the senders 155 to control this notification feature by turning it on or off and specifying the amount of information received in the notification using their respective notification setting data 195e.

As yet an another optional feature, a sender 155 that discovered that the sender 155 operates in an industry designated in the no interest data 190e by a recipient 180 may not necessarily wish to terminate messages intended for the recipient 180. The original sender 155 may wish to explore possible synergistic relationships with other senders 155. For example, the sender 155 may wish to collaborate with a alternate sender 155 from an industry that has been specified in the interest data 190d from of the recipient 180. In this manner, the alternate sender 155 may serve as the primary contact with the recipient 180. Thus, the original sender 155 and the alternate sender 155 may collaborate on dispatching a message to the recipient 180. As an example, if a recipient 180 designates financial service companies in its no interest data 190e and home improvement companies in its interest data 190e, then a financial service company may partner with a home improvement company on sending a message to the recipient 180. In this example, the home improvement company (alternate sender) may take the "lead" on the message by describing various home improvement products and/or services that it provides while indicating that, if needed, a second mortgage line of credit to cover the costs associated with the home improvements are also available from their partner (original sender). As another example, the original sender 155 may still dispatch a message to the recipient without directly contacting a partner. To continue the theme introduced above, the original sender 155 may focus the message on obtaining a second mortgage line of credit to cover the costs associated with the home improvements and then provide a listing of home improvement specialists in proximity to the recipients 180.

Thus, it should now be understood that messages from senders falling into "no interest" categories might be modified in several ways. The examples have been discussed above are: (i) terminating the messages; (ii) redirecting the message as originating from a source other than the original sender; and (iii) editing the message to suit an interest of the recipient. To facilitate this process, the web server 110 may scrutinize the sender profiles 195 of other senders 155 in view of the recipient preference profile 190 and provide a listing of other senders that do match the recipient's interest data 190d. Here again, whether the sender 155 desires to avail itself of this additional service may be controlled by the notification setting data 195e.

Based on the above description and the associated drawings, it should now be apparent that the present invention improves many aspects of the exchange of messages between senders and recipients by facilitating the delivery of recipient preference information to senders.

Many features of the preferred embodiment represent design choices selected to best exploit the inventive concept as implemented in a particular messaging environment as pertaining to individual private recipients. However, those skilled in the art will recognize that various modifications can be made without departing from the spirit of the present invention to adapt the concepts of the present invention to address situations where the recipient is a business. For example, a wide variety of database management tools exist that can facilitate access to the recipient preference profiles. The exact manner in which these activities occur is subject to great variation due to practical design choices of the hardware, software, communications and data involved. As another example, the web server 110 may operate as the message dispatcher. Thus, the senders 155 provide instructions to the web server 110 that control the messaging process.

Therefore, the inventive concept in its broader aspects is not limited to the specific details of the preferred embodiments described above, but is defined by the appended claims and their equivalents.

What is claimed is:

1. An information delivery system, comprising:
   a web server in operative communication with a plurality of recipients and a plurality of senders, the plurality of senders desirous of generating messages intended for the plurality of recipients, respectively;
   and wherein:
   the web server includes a plurality of recipient preference profiles corresponding to the plurality of recipients, respectively, and a plurality of sender profiles corresponding to the plurality of senders, respectively;
   each of the recipient preference profiles includes respective information directed to the recipient's preferences for receiving messages;
   the web server provides the plurality of senders with access to the plurality of recipient preference profiles;
   the web server maintains a relationship between a log of recipient preference profiles out of the plurality of recipient preference profiles that have been accessed by a particular sender; and
   for each of the recipient preference profiles in the log of recipient preference profiles, the web server provides a change notification to the particular sender of a change in the recipient preference profile.

2. The information delivery system of claim 1, wherein:
   the web server notifies the particular sender in a format specified in the particular sender's sender profile.

3. The information delivery system of claim 2, wherein:
   each of the recipient preference profiles includes respective interest data;
   each of the sender profiles includes respective industry description data; and
   when a new recipient establishes a new recipient preference profile, the web server provides a new recipient notification to those senders whose industry description data matches the new recipient's interest data.

4. The information delivery system of claim 3, wherein:
   the new recipient notification of industry description data and interest data match is in accordance with instructions provided in the plurality of sender profiles, respectively.

5. The information delivery system of claim 4, wherein:
   each of the recipient preference profiles includes respective no interest data; and if a given sender accesses one of the plurality of recipient preference profiles and the given sender's industry description data matches the one of the plurality of recipient preference profiles no interest data, then the web server provides a listing of other senders whose industry description data matches the one of the plurality of recipient preference profiles interest data.

6. The information delivery system of claim 5, wherein:
for each of the recipient preference profiles the web server associates a listing of those of the plurality of senders that have accessed the recipient preference profile; and
the web server utilizes this listing in generating the change notifications.

7. The information delivery system of claim 1, wherein:
for each of the recipient preference profiles the web server associates a listing of those of the plurality of senders that have accessed the recipient preference profile; and
the web server utilizes this listing in generating the change notifications.

8. The information delivery system of claim 1, wherein:
each of the recipient preference profiles includes respective interest data;
each of the sender profiles includes respective industry description data; and
when a new recipient establishes a new recipient preference profile, the web server provides a new recipient notification to those senders whose industry description data matches the new recipient's interest data.

9. The information delivery system of claim 8, wherein:
the new recipient notification of industry description data and interest data match is in accordance with instructions provided in the plurality of sender profiles, respectively.

10. A method of operating web server for exchanging information between a plurality of recipients and a plurality of senders desirous of generating messages intended for the plurality of recipients, respectively; the method comprising the step(s) of:
storing a plurality of recipient preference profiles corresponding to the plurality of recipients, respectively, and a plurality of sender profiles corresponding to the plurality of senders, respectively, each of the recipient preference profiles includes respective information directed to the recipient's preferences for receiving messages;
providing the plurality of senders with access to the plurality of recipient preference profiles;
maintaining a relationship between a log of recipient preference profiles out of the plurality of recipient preference profiles that have been accessed by a particular sender; and
for each of the recipient preference profiles in the log of recipient preference profiles, providing a change notification to the particular sender of a change in the recipient preference profile.

11. The method of claim 10, further comprising the step(s) of:
notifying the particular sender in a format specified in the particular sender's sender profile.

12. The method of claim 11, wherein:
each of the recipient preference profiles includes respective interest data;
each of the sender profiles includes respective industry description data; and
further comprising the step(s) of:
when a new recipient establishes a new recipient preference profile, providing a new recipient notification to those senders whose industry description data matches the new recipient's interest data.

13. The method of claim 12, further comprising the step(s) of:
providing the new recipient notification of industry description data and interest data match in accordance with instructions provided in the plurality of sender profiles, respectively.

14. The method of claim 13, wherein:
each of the recipient preference profiles includes respective no interest data; and
further comprising the step(s) of:
if a given sender accesses one of the plurality of recipient preference profiles and the given sender's industry description data matches the one of the plurality of recipient preference profiles no interest data, then providing a listing of other senders whose industry description data matches the one of the plurality of recipient preference profiles interest data.

15. The method of claim 14, further comprising the step(s) of:
for each of the recipient preference profiles, associating a listing of those of the plurality of senders that have accessed the recipient preference profile; and
utilizing this listing in generating the change notifications.

16. The method of claim 10, further comprising the step(s) of:
for each of the recipient preference profiles, associating a listing of those of the plurality of senders that have accessed the recipient preference profile; and
utilizing this listing in generating the change notifications.

17. The method of claim 10, wherein:
each of the recipient preference profiles includes respective interest data;
each of the sender profiles includes respective industry description data; and
further comprising the step(s) of:
when a new recipient establishes a new recipient preference profile, providing a new recipient notification to those senders whose industry description data matches the new recipient's interest data.

18. The method of claim 17, further comprising the step(s) of:
providing the new recipient notification of industry description data and interest data match in accordance with instructions provided in the plurality of sender profiles, respectively.

* * * * *

(12) EX PARTE REEXAMINATION CERTIFICATE (8666th)
United States Patent
Law

(10) Number: US 7,058,586 C1
(45) Certificate Issued: Nov. 15, 2011

(54) INFORMATION DELIVERY SYSTEM FOR PROVIDING SENDERS WITH A RECIPIENT'S MESSAGING PREFERENCES

(75) Inventor: Robert A. Law, Ridgefield, CT (US)

(73) Assignee: Pitney Bowes Inc., Stamford, CT (US)

Reexamination Request:
No. 90/011,234, Sep. 15, 2010

Reexamination Certificate for:
Patent No.: 7,058,586
Issued: Jun. 6, 2006
Appl. No.: 09/588,763
Filed: Jun. 6, 2000

(51) Int. Cl.
*G06Q 10/00* (2006.01)

(52) U.S. Cl. ............... 705/5; 705/1.1; 705/E17.109
(58) Field of Classification Search ............ 705/10
See application file for complete search history.

(56) References Cited

To view the complete listing of prior art documents cited during the proceeding for Reexamination Control Number 90/011,234, please refer to the USPTO's public Patent Application Information Retrieval (PAIR) system under the Display References tab.

*Primary Examiner*—Charles Craver

(57) ABSTRACT

An information delivery system includes a web server in operative communication with a plurality of recipients and a plurality of senders, the plurality of senders desirous of generating messages intended for the plurality of recipients, respectively. The web server includes a plurality of recipient preference profiles corresponding to the plurality of recipients, respectively, and a plurality of sender profiles corresponding to the plurality of senders, respectively. Each of the recipient preference profiles includes respective information directed to the recipient's preferences for receiving messages and the web server provides the plurality of senders with access to the plurality of recipient preference profiles. The web server maintains a relationship between a log of recipient preference profiles out of the plurality of recipient preference profiles that have been accessed by a particular sender. For each of the recipient preference profiles in the log of recipient preference profiles, the web server provides a change notification to the particular sender of a change in the recipient preference profile.

At the time of issuance and publication of this certificate, the patent remains subject to pending reexamination control number 95/001,301 filed Jan. 22, 2010. The claim content of the patent may be subsequently revised if a reexamination certificate issues from the reexamination proceeding.

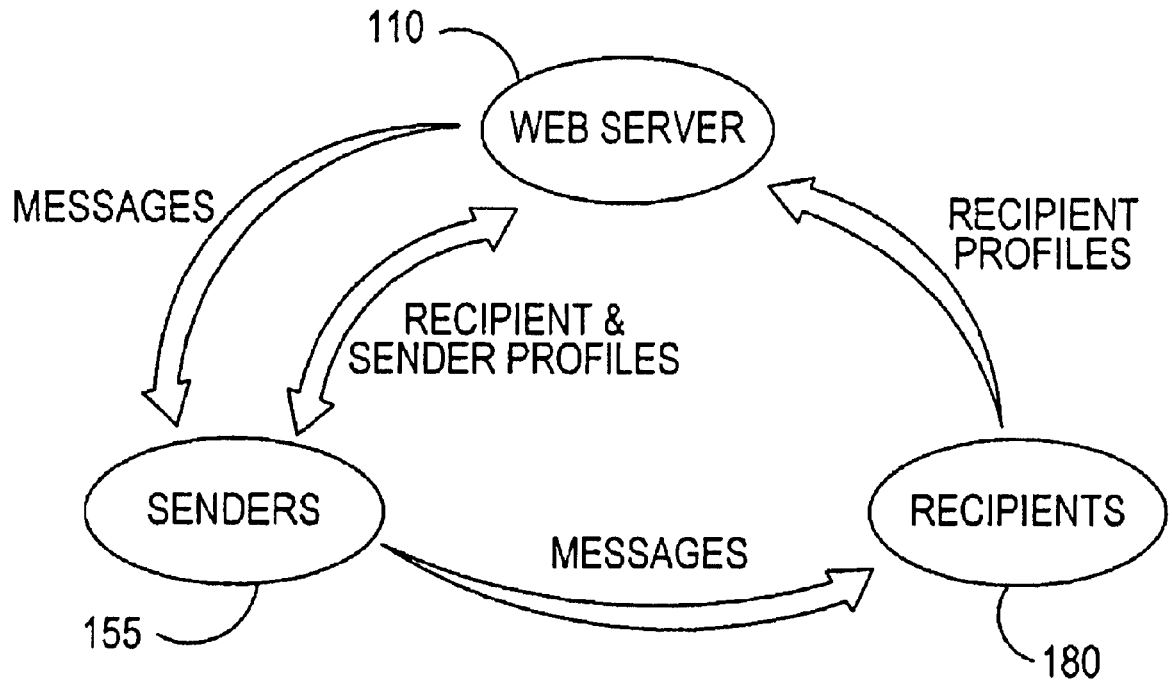

EX PARTE REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1 and 10 is confirmed.

Claims 2-9 and 11-18 were not reexamined.

\* \* \* \* \*

(12) INTER PARTES REEXAMINATION CERTIFICATE (1108th)
United States Patent
Law

(10) Number: US 7,058,586 C2
(45) Certificate Issued: May 12, 2015

(54) INFORMATION DELIVERY SYSTEM FOR PROVIDING SENDERS WITH A RECIPIENT'S MESSAGING PREFERENCES

(75) Inventor: Robert A. Law, Ridgefield, CT (US)

(73) Assignee: PITNEY BOWES INC., Stamford, CT (US)

Reexamination Request:
No. 95/001,301, Jan. 22, 2010

Reexamination Certificate for:
Patent No.: 7,058,586
Issued: Jun. 6, 2006
Appl. No.: 09/588,763
Filed: Jun. 6, 2000

Reexamination Certificate C1 7,058,586 issued Nov. 15, 2011

(51) Int. Cl.
*G06Q 10/00* (2012.01)
*G06Q 10/02* (2012.01)
*G06Q 30/02* (2012.01)

(52) U.S. Cl.
CPC ............... *G06Q 10/02* (2013.01); *G06Q 30/02* (2013.01)

(58) Field of Classification Search
None
See application file for complete search history.

(56) References Cited

To view the complete listing of prior art documents cited during the proceeding for Reexamination Control Number 95/001,301, please refer to the USPTO's public Patent Application Information Retrieval (PAIR) system under the Display References tab.

*Primary Examiner* — Charles Craver

(57) ABSTRACT

An information delivery system includes a web server in operative communication with a plurality of recipients and a plurality of senders, the plurality of senders desirous of generating messages intended for the plurality of recipients, respectively. The web server includes a plurality of recipient preference profiles corresponding to the plurality of recipients, respectively, and a plurality of sender profiles corresponding to the plurality of senders, respectively. Each of the recipient preference profiles includes respective information directed to the recipient's preferences for receiving messages and the web server provides the plurality of senders with access to the plurality of recipient preference profiles. The web server maintains a relationship between a log of recipient preference profiles out of the plurality of recipient preference profiles that have been accessed by a particular sender. For each of the recipient preference profiles in the log of recipient preference profiles, the web server provides a change notification to the particular sender of a change in the recipient preference profile.

**Attention is directed to the decision of *Pitney Bowes Inc. et al v. Zumbox, Inc.* US Dist - California Central (Western Div - Los Angeles) 2:09cv7373 relating to this patent. This reexamination may not have resolved all questions raised by this decision. See 37 CFR 1.552(c) for *ex parte* reexamination and 37 CFR 1.906(c) for *inter partes* reexamination.**

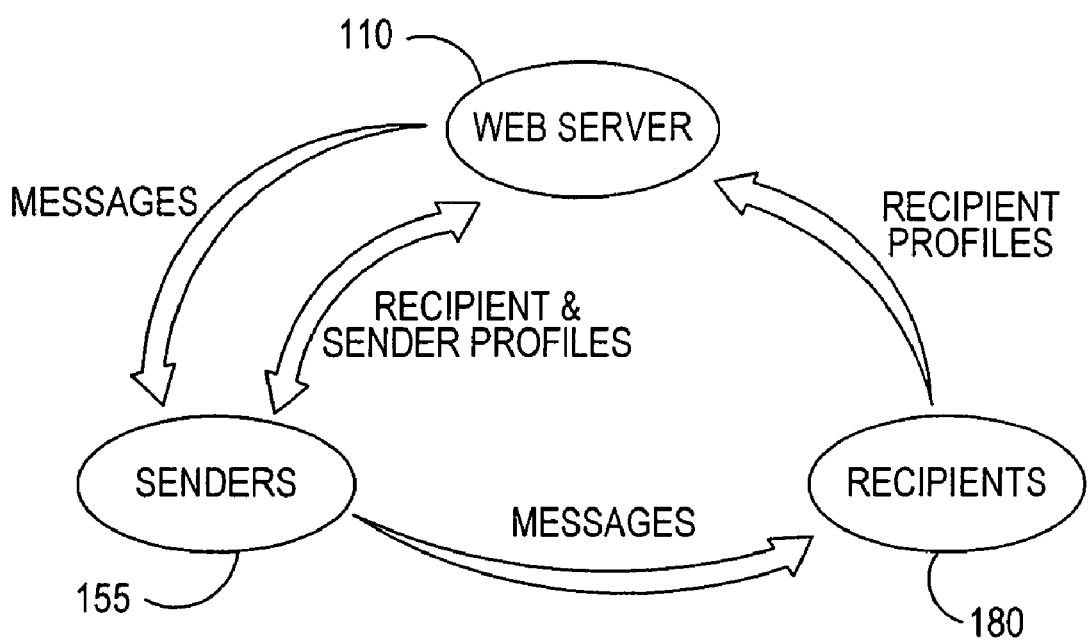

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-18 is confirmed.

* * * * *